(12) United States Patent
Mitchell (10) Patent No.: US 8,576,064 B1
(45) Date of Patent: Nov. 5, 2013

(54) SYSTEM AND METHOD FOR MONITORING TRANSMITTING PORTABLE ELECTRONIC DEVICES

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 815 days.

(21) Appl. No.: 11/807,551

(22) Filed: May 29, 2007

(51) Int. Cl.
*G08B 1/08* (2006.01)

(52) U.S. Cl.
USPC ............. 340/539.11; 340/539.1; 340/539.26

(58) Field of Classification Search
USPC ............... 340/539.1, 505, 539.11, 518, 525, 340/539.26, 565, 945, 572.1; 455/456.1, 455/540
See application file for complete search history.

(56) References Cited

U.S. PATENT DOCUMENTS

| | | | | |
|---|---|---|---|---|
| 4,866,515 A * | 9/1989 | Tagawa et al. ................ 725/77 |
| 5,559,865 A * | 9/1996 | Gilhousen .................... 455/431 |
| 6,058,288 A * | 5/2000 | Reed et al. .................. 455/3.06 |
| 6,266,815 B1 * | 7/2001 | Shen et al. ..................... 725/76 |
| 6,566,868 B2 * | 5/2003 | Bartingale et al. ....... 324/207.24 |
| 6,580,915 B1 * | 6/2003 | Kroll .......................... 455/456.3 |
| 6,751,442 B1 * | 6/2004 | Barrett ......................... 455/11.1 |
| 6,782,266 B2 * | 8/2004 | Baer et al. ................. 455/456.4 |
| 6,782,392 B1 * | 8/2004 | Weinberger et al. ............... 1/1 |
| 6,888,443 B2 * | 5/2005 | Ritter ......................... 340/5.64 |
| 7,123,874 B1 * | 10/2006 | Brennan ........................... 455/1 |
| 7,131,136 B2 * | 10/2006 | Monroe ......................... 725/105 |
| 7,280,825 B2 * | 10/2007 | Keen et al. ..................... 455/431 |
| 7,444,154 B2 * | 10/2008 | Kroll ........................... 455/456.1 |
| 7,570,274 B2 * | 8/2009 | Humphries .................... 345/659 |
| 7,587,733 B2 * | 9/2009 | Keen et al. ....................... 725/76 |
| 7,734,315 B2 * | 6/2010 | Rathus et al. .............. 455/569.2 |
| 2002/0145536 A1 * | 10/2002 | Clise ........................ 340/825.72 |
| 2003/0134627 A1 * | 7/2003 | Himmel et al. ................ 455/419 |
| 2003/0143944 A1 * | 7/2003 | Martin et al. ................. 455/3.01 |
| 2004/0018845 A1 * | 1/2004 | Kroll .......................... 455/456.1 |
| 2005/0048987 A1 * | 3/2005 | Glass .......................... 455/456.1 |
| 2005/0206610 A1 * | 9/2005 | Cordelli ........................ 345/156 |
| 2006/0038677 A1 * | 2/2006 | Diener et al. .................. 340/540 |
| 2007/0164609 A1 * | 7/2007 | Shalam et al. ................ 307/10.1 |
| 2007/0213009 A1 * | 9/2007 | Higashida et al. ............. 455/62 |
| 2007/0241927 A1 * | 10/2007 | Ratnakar .................. 340/825.28 |
| 2007/0275690 A1 * | 11/2007 | Hunter et al. ............... 455/404.2 |
| 2008/0004040 A1 * | 1/2008 | Bogart ....................... 455/456.1 |
| 2011/0050442 A1 * | 3/2011 | Hefferon ....................... 340/679 |

* cited by examiner

*Primary Examiner* — Travis Hunnings
*Assistant Examiner* — Rufus Point
(74) *Attorney, Agent, or Firm* — Donna P. Suchy; Daniel M. Barbieri (57) ABSTRACT

The present invention is a system and method for monitoring transmitting portable electronic devices (T-PEDs). The system may comprise one or more of the following features: (a) a plurality of radio frequency (RF) sensors; (b) a processing unit; and (c) a T-PED detection notification system. The RF sensors may be distributed throughout a given space in a substantially uniform arrangement so as to provide a nodal environment whereby the RF transmissions of a given T-PED may be associated with one or more RF sensors thereby allowing the monitoring system to calculate the location of the T-PED. In a particular embodiment of the invention, the RF sensors are integrated within the distributed network of an in-flight entertainment system of an aircraft.

18 Claims, 8 Drawing Sheets

SYSTEM AND METHOD FOR MONITORING TRANSMITTING PORTABLE ELECTRONIC DEVICES

FIELD OF THE INVENTION

This invention relates generally to mobile communications and, more specifically, to monitoring and regulation of the use of wireless technology onboard aircraft.

BACKGROUND OF THE INVENTION

The use of cellular telephones and other wireless devices onboard aircraft has, to this point, been banned by the Federal Communications Commission (FCC reference section 22.925, part 22, subpart H) and restricted by the Federal Aviation Administration (FAA). Similarly other countries have followed this procedure. The FCC ban is in place primarily to avoid interference with terrestrial cellular systems while an aircraft flies over a cellular network. The FAA regulations restrict the use of cell phones on aircraft to ensure against interference with onboard communication and navigation equipment. However, it remains possible that these restrictions on airborne use of cell phones and other wireless devices may be withdrawn if certain procedures are developed and technological hurdles overcome.

Proposed solutions to the concerns regarding terestrial interference have resulted in systems which permit a transmitting portable electronic device (T-PED) operating below threshold transceiving settings to access wireless access point for WLAN devices and/or a a pico cell for controlling cellphone access on the aircraft. In small cellular communications networks, pico cells are the smallest of radio cells.

Guidelines governing allowable settings have been proposed by the Radio Technical Commission for Aeronautics (RTCA) in document number DO-294B entitled "Guidance on Allowing Transmitting Portable Electronic Devices" and incorporated herein by reference.

This document addresses near-term T-PED technologies such as existing devices enabled with cellular technologies, wireless local area networks (WLANS), and wireless personal area networks (WPANS) as well as emerging PED technologies, for example active RF Identification (RFID) tags, transmitting medical devices, and picocells for such devices enabled by cellular technologies for use onboard aircraft. The document defines a process by which aircraft operators and/or manufacturers may assess the risk of interference due to a specific T-PED technology within any aircraft type and model. It also provides a means for aviation authorities and others to determine acceptable and enforceable policies and processes for passenger and crew use of T-PEDs.

With the added convenience of in-flight wireless communication capabilities for passengers comes the need for monitoring the nature of those communications to ensure that any RF transmissions remain within given tolerance levels deemed to be safe with respect to potential interference with terrestrial or onboard systems. It is impractical for crew members to be reasonably certain that non-permitted uses (e.g. prohibited devices, permitted devices operating at unauthorized transceiving settings or at unauthorized times, etc.) are not occurring merely by visual observation. Additionally, the possibility exists that unintentional prohibited uses (e.g. unauthorized devices being inadvertently left on when stowed) may occur where crew members would be completely unaware of the violation.

As such, it would be desirable to provide a system and method for monitoring the operations of onboard T-PEDs to ensure compliance with usage guidelines.

SUMMARY OF THE INVENTION

Accordingly, the present invention is directed to a system and method for monitoring and regulating the use of wireless technology onboard aircraft.

In an embodiment of the invention, a transmitting portable electronic device (T-PED) monitoring system may comprise one or more of the following features: (a) a plurality of radio frequency (RF) sensors; (b) one or more processing units; and (c) a T-PED detection notification system.

In a further embodiment of the invention, a passenger entertainment system may comprise: (a) a plurality of display terminals; (b) a plurality of RF sensors; (c) one or more processing units; and (d) a transmitting portable electronic device (T-PED) detection notification system.

In still a further embodiment of the invention, a method for monitoring the use of T-PEDs onboard an aircraft may comprise: (a) receiving RF signals from a T-PED via one or more RF sensors of a plurality of RF sensors; (b) comparing a transceiving parameter of the T-PED to an allowable transceiving parameter; (c) calculating an estimated location or range of locations of the T-PED; and (d) providing a notification of the location of the T-PED.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Reference will now be made, in detail, to presently preferred embodiments of the invention. Additional details of the invention are provided in the examples illustrated in the accompanying drawings.

Figure 1:
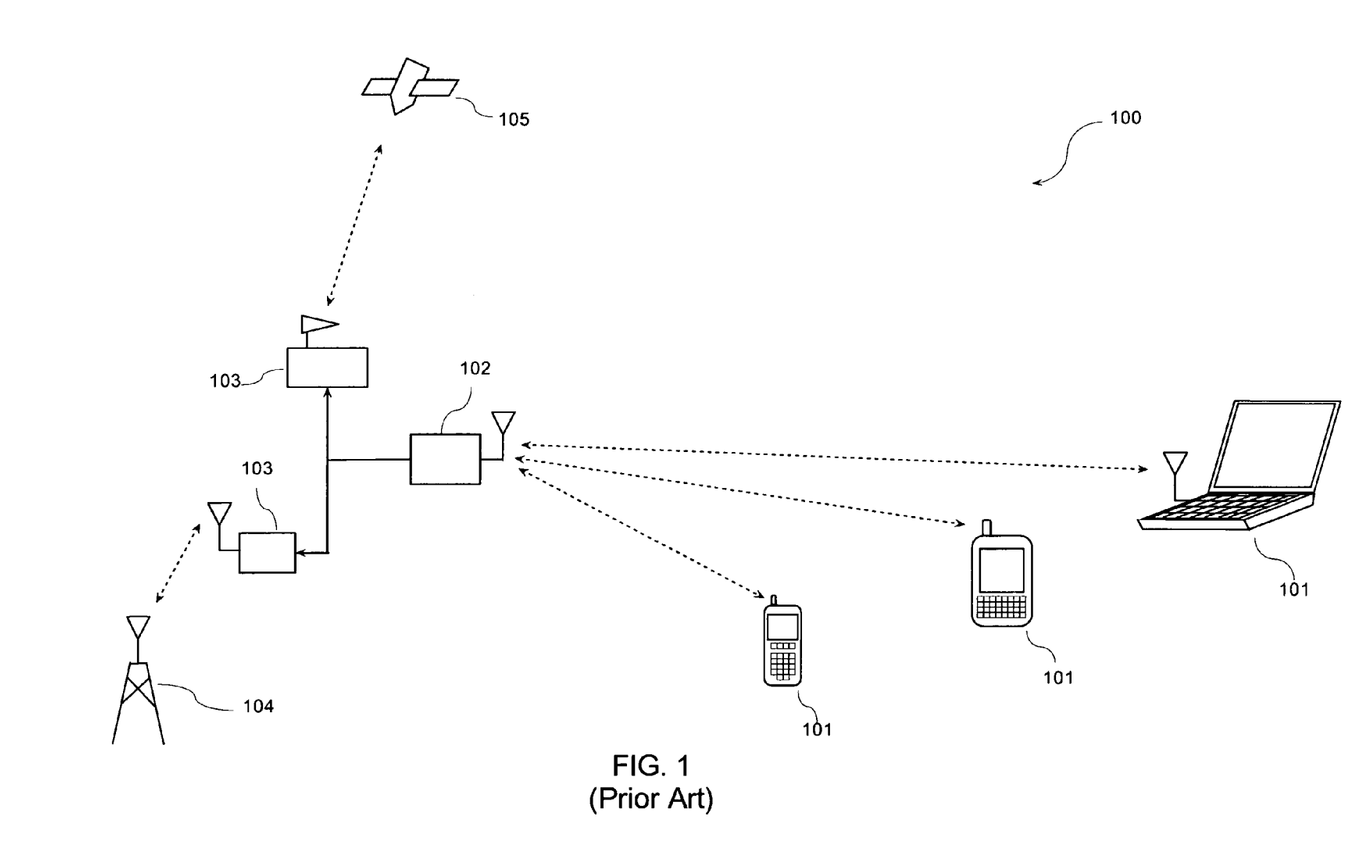
FIG. 1 illustrates a pico cell communication system of the prior art.

Referring to FIG. 1, an onboard wireless communications and data transfer network is presented. Proposed solutions to the concerns regarding terestrial interference created by wireless device use on aircraft have resulted in systems which permit devices operating below threshold power settings to access a pico cell located on the aircraft. Such systems are presented U.S. Pat. No. 7,113,780 to McKenna and commonly assigned U.S. Pat. No. 7,187,927 to Mitchell, each of which is incorporated herein by reference. In small cell phone networks, pico cells are the smallest of radio cells. Pico cells often extend to just a few hundred meters in diameter in ground applications. Pico cells are generally used to fill in areas of poor coverage or provide coverage in remote locations where there is not standard cellular service available. Onboard an aircraft, a T-PED 101 transceives signals which are routed through a pico cell 102. The pico cell 102 then communicates from the aircraft using a transceiver 103 to a ground station 104 or satellite 105 and connects to a public switched telephone network (PSTN) or the internet. Such systems have been previously disclosed which incorporate popular wireless protocols, such as CDMA, GSM, 2.5G, 3G, WiFi 802.11x, Bluetooth and Ultrawideband among others, as well as satellite communications systems, such as Globalstar and Inmarsat.

As previously presented, such use of T-PEDs onboard aircraft during flight may be subject to certain regulations and restrictions regarding the type of devices permitted, the power settings of those devices, and the times during a flight in which they may be used. In order to address such concerns, the present invention provides a system and method for monitoring the use of wireless devices in flight.

Additionally, though various aircraft may lack cell phone pico cell capabilities, accidental passenger use of a cell phone (left uncontrolled) will still constitute violations of FCC, FAA and other world-wide regulatory rules and laws. As such, there is a need to monitor devices in such environments as well in order to maintain spectrum standards and aircraft system integrity/safety.

Figure 2:
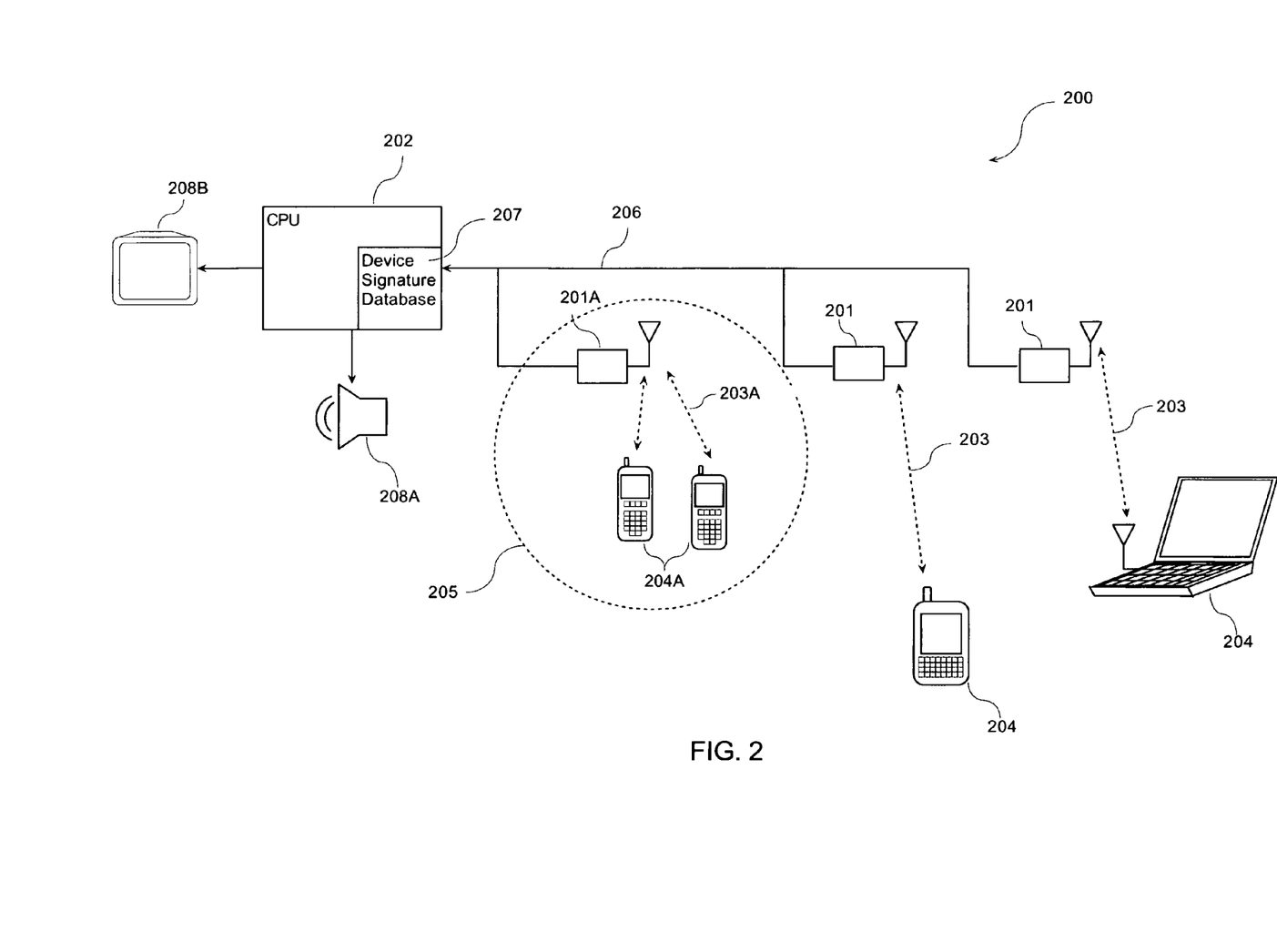
FIG. 2 illustrates a T-PED monitoring system according to an embodiment of the present invention.

Referring to FIG. 2, a T-PED monitoring system 200 in accordance with an embodiment of the present invention is disclosed. The system 200 may comprise a plurality of radio frequency (RF) sensors 201. The sensors may be digitally linked to a head end processing unit 202 (through the RF sensor and network processing unit within the RF sensors 201) which receives the digital representation or summary of RF signals 203 emitted by plurality of T-PEDs 204. In a particular embodiment of the invention, the plurality of RF sensors 201 may be distributed about an aircraft cabin in a uniform manner such that the RF signals 203A of only a few T-PEDs 204A located in a radius 205 around a given sensor 201A may have the highest relative power levels among all cabin sensors or, optionally, may reach a threshold level for power levels for individual bands as prescribed in advance. Each band and RF power level may be receivable by RF sensor 201A. Such a configuration creates a nodal environment whereby particular T-PEDs 204A within the signal receiving radius 205 of a particular sensor 201A may be associated with the cabin zone which includes that sensor 201A.

In a particular embodiment, the RF sensors 201 may comprise cognitive radio functionality. Cognitive radio (CR) is a paradigm for wireless communication in which either a network or an individual wireless node monitors its RF environment and changes particular transmission or reception parameters in order to execute its tasks more efficiently.

A CR is often a software defined radio with a "cognitive engine" brain. Conceptually, the cognitive engine responds to its environment by configuring the radio for whatever combinations of waveform, protocol, operating frequency, and networking are required. A CR monitors its own performance continuously, by ascertaining the surrounding RF environment, channel conditions, link performance, etc., and adjusting the CRs transceiving parameters to deliver the needed quality of service subject to an appropriate combination of user requirements, operational limitations, and regulatory constraints. Common CR functionality includes techniques for detecting allocated but unused RF spectrum and efficiently sharing the unused spectrum.

Due to this ability to account for the its RF environment, cognitive radios are fast becoming the desired technology for scanning frequency bands for the purpose of "listening" before the use of those bands. Because of the diverse types of wireless T-PEDs 204 which may be brought onboard an aircraft, scanning for these devices requires the unique ability to identify different transceiving parameters (e.g. modulation, interleave, channel coding, power, gain, among others) on many different frequency bands.

The CR envisioned for incorporation in the present invention is similar to the traditional definition in that it scans or detects users in an allocated spectrum, and provides a "summary of use" and/or an alarm when there are detected users. This alarm may be transmitted over a wired or wireless network, to the flight attendant display and to the passenger displays nearest the highest RF power levels (one or more seats) where an actionable message for discontinuing use of transmitting PED is either displayed or audibly announced, as will be discussed below.

Figure 6:
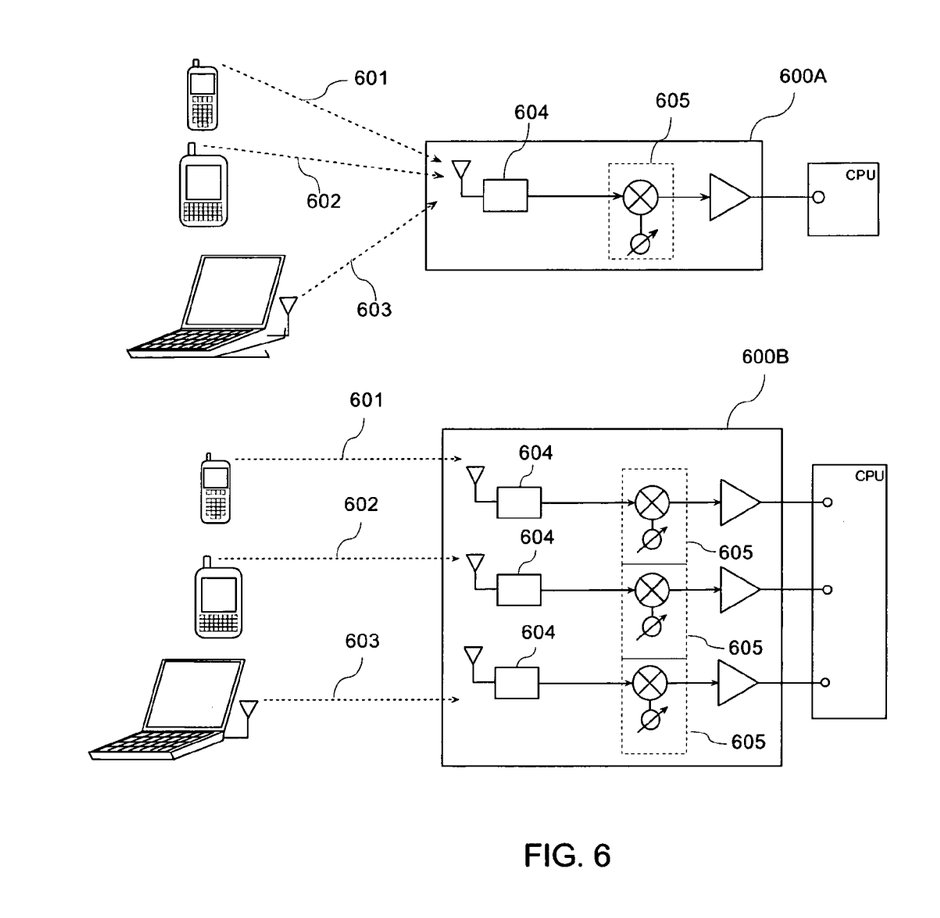
FIG. 6 illustrates various embodiments of an RF sensor according to the present invention.

A CR of the present invention may auto-select from may disparate modulation types (e.g. 802.11x, Bluetooth, GSM, CDMA, FM, AM, etc.) and from many different frequency bands. Referring to FIG. 6, various embodiments of a CR scanning methodology are presented. A CR sensor 600A may comprise a single channel whereby RF transmissions across a spectrum of frequencies may be monitored. For example GSM 601, CDMA, 602 and WiFi 603 band RF transmissions may all be received by a transceiver 604. Notionally, an mixer 605 may be used to tune the sensor 600 across the various frequencies in a tune-and-dwell progression.

In a further embodiment, the CR sensor 600B may comprise multiple parallel channels whereby several frequency bands 601, 602, 603 may be scanned simultaneously by multiple mixers 605. Such a configuration will provide enhanced performance over the single channel sensor 600A.

Upon reception of an RF signal 203 from a T-PED 204, a CR-based sensor 201 may pass the measured RF environment parameters to a processing unit 202 via a data bus 206. The processing unit may be common in the art and may include those manufactured by Intel™, Texas Instruments™ or other processor manufacturer. The processing unit 202 may compile the RF environment parameters into one or more transceiving signatures corresponding to one or more T-PEDs 204.

These transceiving signatures may be compared by the processor 202 to a database 207 containing transceiving signatures which are known to violate prescribed T-PED usage protocols. The data objects comprising the database 207 may also include information regarding various permitted and prohibited T-PED transceiving protocols for numerous geographic regions. The processing unit 202 may incorporate global positioning system (GPS) or inertial navigation system (INS) data to select from the various protocols depending on the current location of an aircraft. For example, certain governmental entities may establish differing compliance standards for T-PEDs on board aircrafts. An aircraft traveling internationally across several countries may be subject to numerous different T-PED standards during a single flight. Knowledge of the current position of the aircraft combined with T-PED regulation data for each of those countries allows the inventive system to ensure compliance by passengers at all times during a given flight.

Because of the distributed and localized nature of the RF sensors 201, the processor may triangulate the source of the violating transceiving signature to within a relatively small number of passengers located near the signal receiving radius 205 of the subject RF sensor 201A.

Figure 3:
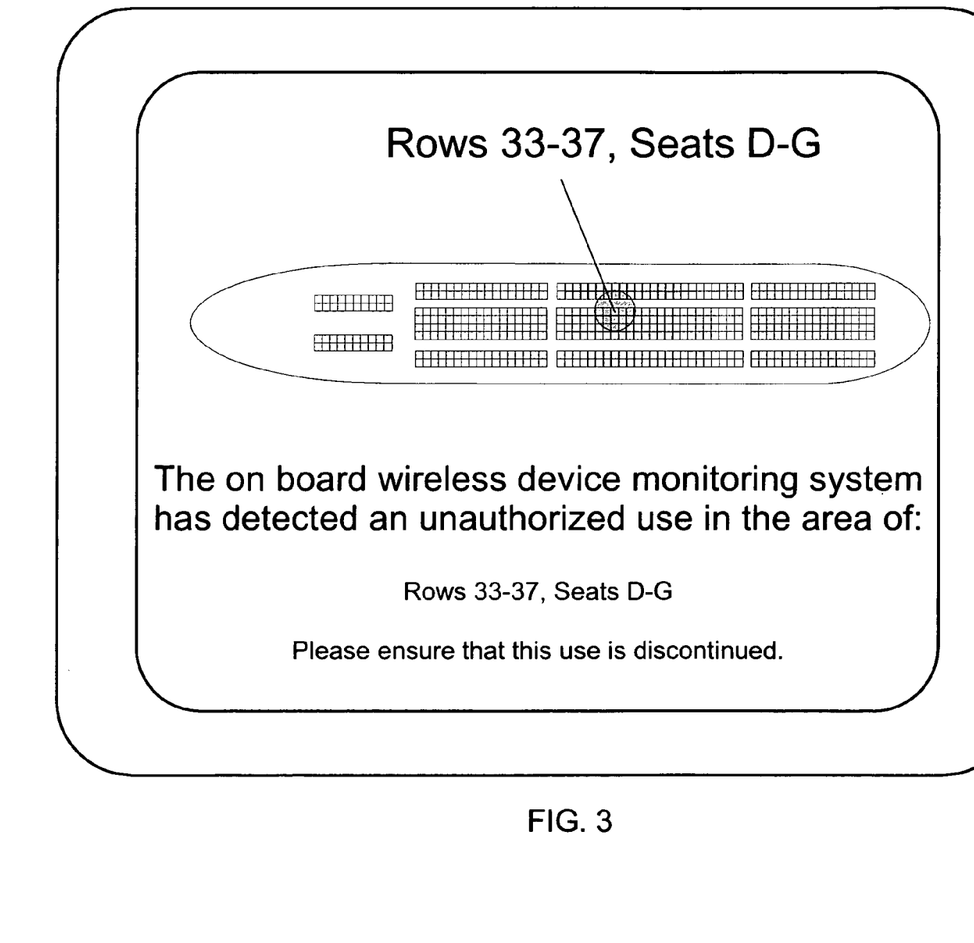
FIG. 3 illustrates a graphical display depicting the general location of an unauthorized T-PED usage onboard an aircraft.

The T-PED monitoring system 200 may further comprise notification mechanisms 208 whereby the crew may be made aware of the occurrence of an in-flight T-PED usage violation. Such mechanisms may comprise audio notification 208A and/or visual display notification 208B. Audio notification 208A may comprise either a crew-specific notice directing a crew member to the offending T-PED location or a cabin wide passenger advisory stating that a T-PED usage violation has been detected. Visual display notification 208B may comprise a computer-generated image having a cabin seating overlay and a seat-specific indicator of the location of the T-PED usage violation as shown in FIG. 3.

Figure 4:
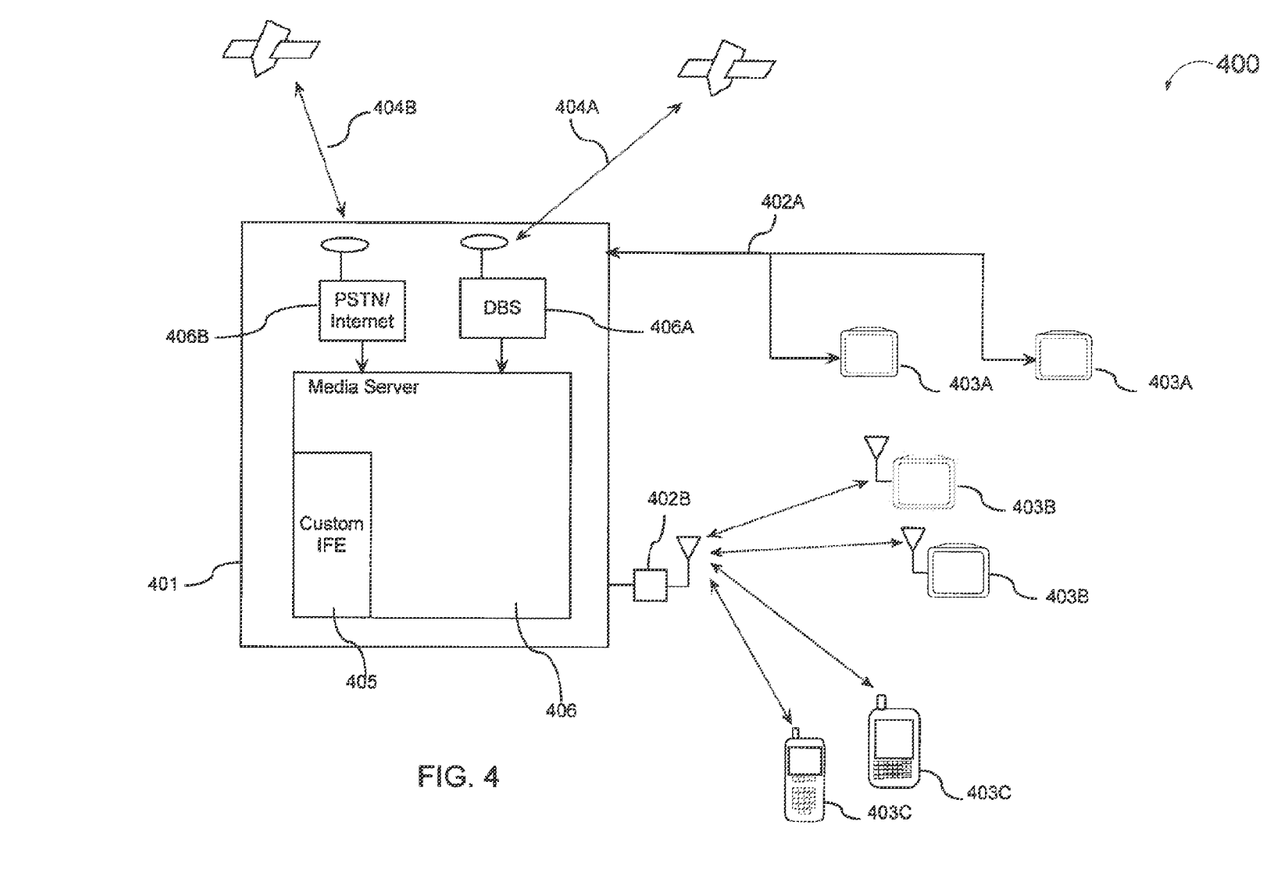
FIG. 4 illustrates an in-flight entertainment system of the prior art.

Referring to FIG. 4, modern aircraft designs commonly incorporate in-flight entertainment (IFE) systems 400. Such systems typically comprise components necessary to present video, voice and data content to airline crew and passengers while in flight. Such systems may include the Total Entertainment System (TES), Enhanced Total Entertainment System (eTES), and Digital Total Entertainment System (dTES) products developed by Rockwell Collins. These systems may comprise head end equipment 401 where programming and control functions originate, a distribution subsystem 402, and multiple IFE terminals 403 located throughout the cabin. In some implementations, each seat location in an aircraft has a separate associated IFE terminal 403A. The entertainment content may either be received from outside sources 404 or be accessed from custom IFE media 405 maintained in onboard servers 406. Outside sources of content may include direct broadcast satellite (DBS) signals 404A (such as DirecTV®), and public switched telephone network (PSTN) or internet signals 404B received by one or more transceivers 406. DBS systems 406A may include the TAILWIND® products developed by Rockwell Collins. Current IFE systems may be wired systems 402A that provide access to entertainment content to passengers from seat-back or overhead IFE terminals 403A. The IFE terminals 403A may include the SLIMLINE™ products developed by Rockwell Collins.

In a further embodiment the distribution system may be a wireless system. The head end equipment 401 may include a transceiver 402B for transceiving user input and/or entertainment content between a plurality of wireless IFE terminals 403B and the head end equipment 401. Such a configuration eliminates the need for space-consuming wiring as well as drastically simplifying retrofit installations of IFE systems into aircraft which were not originally constructed with such capabilities.

In another particular embodiment, the head end equipment 401 transmits content to a plurality of T-PEDs 403C operating as IFE terminals, as presented in commonly assigned U.S. patent application Ser. No. 11/151,108, incorporated herein by reference.

It can be seen that IFE systems provide an existing distributed network where a specific electronic device (e.g. an IFE terminal 403) is associated with a specific passenger. Such a system may provide a suitable platform for incorporating a wireless device monitoring systems such as those previously presented.

Figure 5:
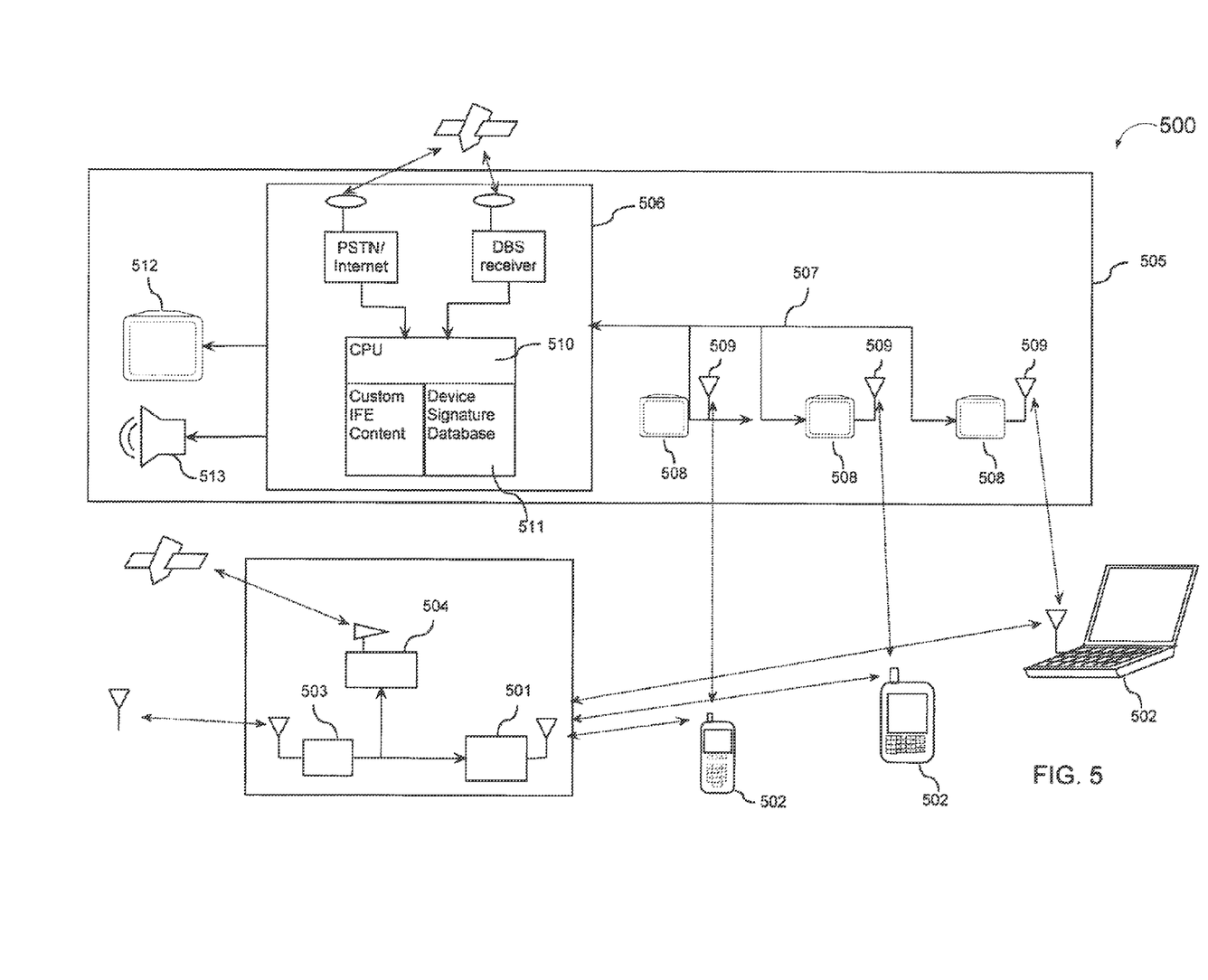
FIG. 5 illustrates a T-PED monitoring system according to an embodiment of the present invention.

Referring to FIG. 5, in a particular embodiment, a T-PED monitoring system 500 may be integrated into an IFE system 505. An aircraft may have a pico cell 501 for transceiving wireless communications from various T-PEDs 502. The pico cell may be CDMA, GSM, 2.5G, 3G, or an access point for WiFi 802.11x, Bluetooth, Ultrawideband, Globalstar and/or Inmarsat compatible, among others, and may have terestrial 503 and/or satellite 504 uplink/downlink capabilities. As such a T-PED monitoring system may be required.

The IFE system 505 may comprise head end processing equipment 506 where programming and control functions originate, a distribution subsystem 507, and multiple IFE terminals 508 located throughout the cabin. Each IFE terminal may comprise an RF sensor 509. The RF sensor 509 may monitor RF energy levels across one or more defined RF spectrum bands so as to detect the presence of T-PEDs 502 operating in those bands. The RF sensor may transmit those measurements back to the head end processing equipment 506 via the IFE distribution subsystem 507. In a specific embodiment, the RF sensor 509 may be a cognitive radio or cognitive radio on chip. In such an embodiment, the measurements of the RF environment may comprise modulation, interleave, channel coding, power and gain data, among others. The head end processing equipment 506 may receive these measurements and an internal processing unit 510 may compile one or more transceiving signatures based on those measurements. Those compiled signatures may be compared to known T-PED signatures maintained in a device signature database 511. The data objects comprising the database 511 may also include information regarding various permitted and prohibited T-PED transceiving protocols for numerous geographic regions. The processing unit 510 may incorporate global positioning system (GPS) or inertial navigation system (INS) data to select from the various protocols depending on the current location of an aircraft. For example, certain governmental entities may establish differing compliance standards for T-PEDs on board aircrafts. An aircraft traveling internationally across several countries may be subject to numerous different T-PED standards during a single flight. Knowledge of the current position of the aircraft combined with T-PED regulation data for each of those countries allows the inventive system to ensure compliance by passengers at all times during a given flight.

In yet a further embodiment, RF signal processing can be carried out in processing units distributed within the plurality of IFE terminals 508.

The detected presence of a signature which violates established T-PED usage protocols may be presented to the crew via visual 512 or audio 513 notification mechanisms. Additionally, because the T-PED monitoring system 500 is integrated into the IFE system 505, notification of unauthorized T-PED use may be broadcast back to the individual IFE terminals 508 via the IFE distribution subsystem 507 to allow for self-policing of T-PED use by passengers themselves. Such notifications may be similar in nature to those depicted in FIG. 3.

Figure 7:
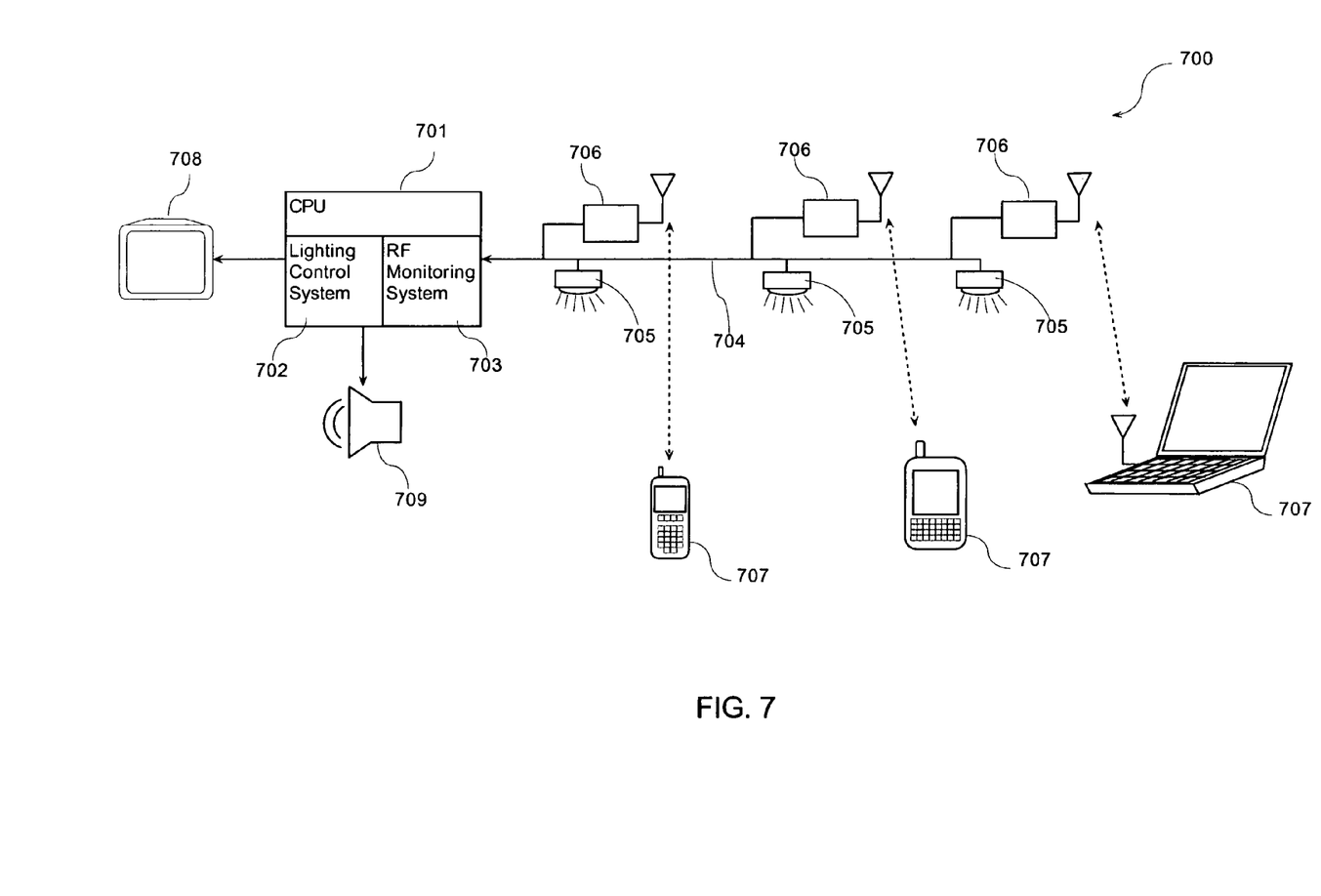
FIG. 7 illustrates a T-PED monitoring system according to an embodiment of the present invention.

In further embodiments, a T-PED monitoring system may be integrated into any other distributed electrical system within an aircraft cabin. Referring to FIG. 7, the T-PED monitoring system 700 may comprise head end equipment 701 where lighting 702 and RF monitoring 703 control functions originate, a distribution subsystem 704, and a plurality of cabin lighting terminals 705 located throughout the cabin. Each cabin lighting terminal 705 may comprise an RF sensor 706 which may receive RF signals from one or more T-PEDs 707. The monitoring system 700 may further comprise a visual 708 or audible 709 notification mechanism. Other distributed electrical systems may include crew-call systems, climate control systems or in-seat personal electronic device power systems.

Figure 8:
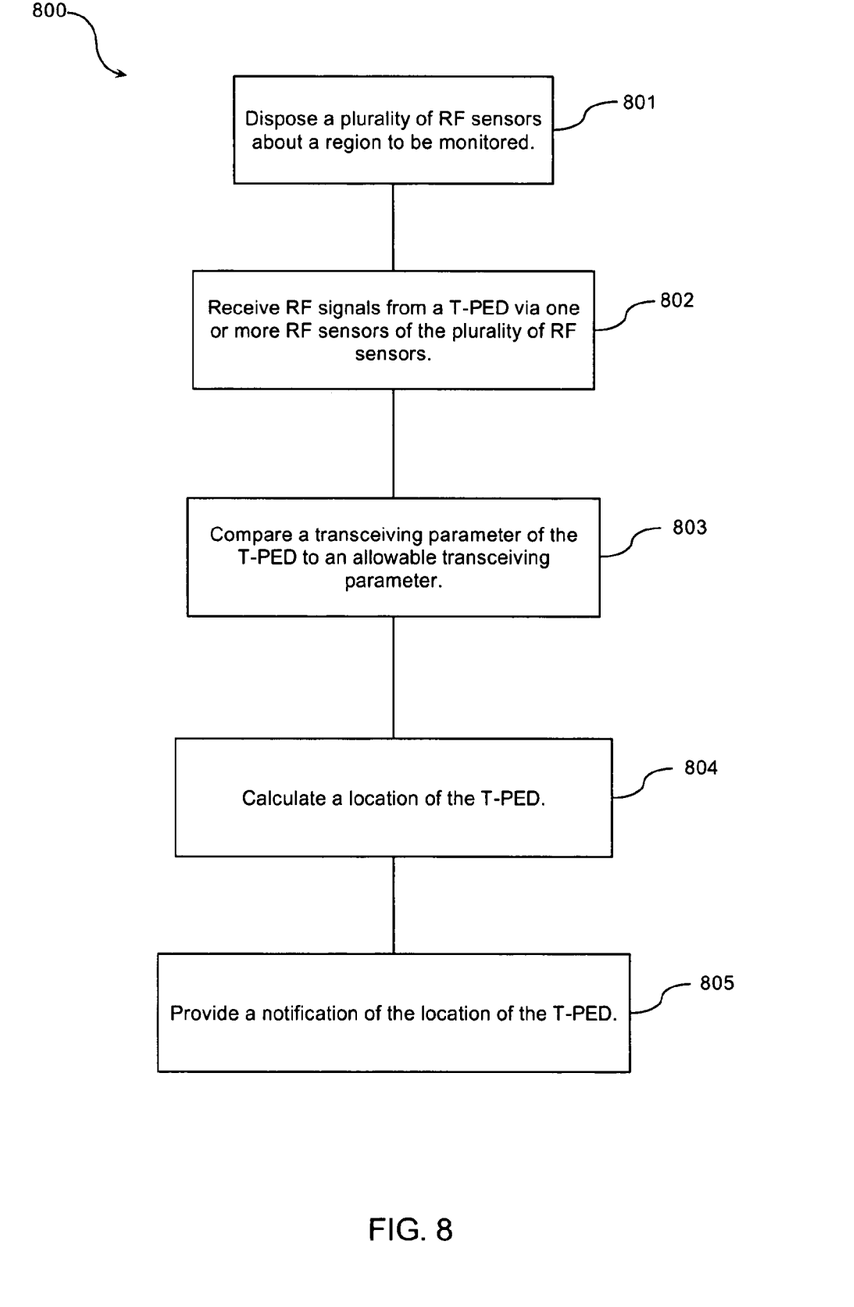
FIG. 8 illustrates a method for monitoring T-PEDs according to an embodiment of the invention.

Referring to FIG. 8, a method for monitoring T-PED devices is presented. A plurality of RF sensors is disposed about the region to be monitored at step 801. The plurality of RF sensors may comprise cognitive radios capable of measuring RF environment parameters such as modulation, interleave, channel coding, relative and absolute power levels and gain, among others, across many different frequency bands. The plurality of RF sensors may be distributed in a substantially uniform manner so as to provide a nodal environment whereby the RF transmissions of a given T-PED may be associated with one or more RF sensors thereby allowing the monitoring system to calculate the location of a given T-PED.

RF signals generated by a T-PED may be received by the RF sensors of the monitoring system at step 802. These RF signals may be those having frequencies in the ranges of common T-PED protocols such as CDMA, GSM, 2.5G, 3G, WiFi 802.11x, Bluetooth and Ultrawideband. Similarly, it should be appreciated by one skilled in the art that the present invention is fully extensible to all regions of the RF spectrum.

Upon receipt of RF signals from a T-PED, the monitoring system may compare the measured transceiving parameters of that signal to established transceiving parameter values known to conform to permitted T-PED uses at step 803. The monitoring system may maintain a database of individual transceiving parameters or particular T-PED signatures which may result in either terestrial or onboard interference.

Should an unauthorized use be detected, the location of the offending T-PED may be calculated at step 804. As previously presented, the RF sensors may be distributed throughout a given space in a substantially uniform arrangement so as to provide a nodal environment whereby the RF transmissions of a given T-PED may be associated with one or more RF sensors. Such a configuration allows the monitoring system to pinpoint the location of the T-PED simply by identifying which RF sensor or group of sensors are receiving the unauthorized signal.

Upon calculation of the location of the T-PED, a notification of that location may be presented to a system user. As previously presented, the invention may be particularly suited to incorporation into a passenger IFE system or other similarly distributed electrical system. Therefore, the notification of the location of the offending T-PED may be displayed on one or more IFE terminals including those crew information terminals as well as individual passenger IFE terminals. Alternately, the notification may take the form of an audible announcement from one or more IFE terminals or over a cabin public address speaker system.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A passenger entertainment system comprising:
   one or more display terminals;
   one or more transmitting portable electronic device (T-PED) radio frequency (RF) sensors integrated within a display terminal of the one or more display terminals;
   at least one processing unit configured for:
      comparing at least one transceiving parameter selected from a modulation, an interleave, a channel coding, a power, and a gain of one or more RF signals received from at least one T-PED to at least one allowable transceiving parameter; and
   a T-PED compliance notification device configured for providing at least one of a visual notification and an audible notification of one or more RF signals received from the at least one T-PED having at least one prohibited transceiving parameter.

2. The system of claim 1, wherein the plurality of T-PED RF sensors comprises:
   a cognitive radio.

3. The system of claim 1,
   wherein the plurality of T-PED RF sensors are substantially uniformly distributed about a region to be monitored.

4. The system of claim 3, wherein the region to be monitored is an aircraft cabin.

5. The system of claim 1, wherein the processing unit is integrated into a display terminal of the one or more display terminals.

6. The system of claim 1, further comprising:
   a database comprising allowable T-PED transceiving parameters.

7. The system of claim 6, wherein the allowable T-PED transceiving parameters include an allowable range of a T-PED transceiving parameter for a first geographic region and an allowable range of the T-PED transceiving parameter for a second geographic region.

8. The system of claim 1, wherein the T-PED compliance notification device includes a device distinct from a T-PED.

9. The system of claim 1, wherein the T-PED compliance notification device includes a display terminal of the one or more display terminals having an integrated T-PED RF sensor.

10. The system of claim 1, wherein a T-PED RF sensor of the one or more of T-PED RF sensors is configured for scanning across multiple frequencies.

11. The system of claim 1, wherein a T-PED RF sensor of the plurality of T-PED RF sensors comprises:
   a first channel configured for receiving signals within a first frequency range; and
   a second channel configured for receiving signals within a second frequency range different that the first frequency range.

12. The system of claim 1, wherein the at least one transceiving parameter is selected from a modulation, an interleave, and a channel coding of one or more RF signals received from at least one T-PED.

13. A method for monitoring transmitting portable electronic devices (T-PED), the method comprising the steps:

receiving one or more radio frequency (RF) signals from at least one T-PED via one or more RF sensors integrated within a display terminal;

comparing at least one transceiving parameter selected from a modulation, an interleave, a channel coding, a power, and a gain of one or more RF signals received from at least one T-PED to at least one allowable transceiving parameter;

and providing at least one of a visual notification and an audible notification of one or more RF signals received from the at least one T-PED having at least one prohibited transceiving parameter.

14. The system of method of claim 13, wherein the providing at least one of a visual notification and an audible notification of a T-PED having at least one prohibited transceiving parameter includes:

providing a visual notification on a display terminal including an integrated RF sensor that received one or more prohibited RF signals from at least one T-PED.

15. The method of claim 14, wherein the calculating an estimated location of the T-PED comprises:

comparing a signal received from a first T-PED RF sensor to a signal received from a second T-PED RF sensor.

16. The method of claim 15, wherein the providing a notification of the location of the T-PED comprises:

providing a notification of the location of the at least one T-PED according to the comparison of the signal received from the first T-PED RF sensor to the signal received from the second T-PED RF sensor.

17. The system of method of claim 13, further comprising:

calculating an estimated location of a T-PED having at least one prohibited transceiving parameter.

18. The system of claim 13, wherein the at least one transceiving parameter is selected from a modulation, an interleave, and a channel coding of one or more RF signals received from at least one T-PED.

* * * * *